(12) United States Patent
Kimura

(10) Patent No.: US 10,591,321 B2
(45) Date of Patent: Mar. 17, 2020

(54) OPTICAL ENCODER

(71) Applicant: Mitutoyo Corporation, Kawasaki, Kanagawa (JP)

(72) Inventor: Akihide Kimura, Saitama (JP)

(73) Assignee: MITUTOYO CORPORATION, Kawasaki (JP)

(*) Notice: Subject to any disclaimer, the term of this patent is extended or adjusted under 35 U.S.C. 154(b) by 135 days.

(21) Appl. No.: 15/920,364

(22) Filed: Mar. 13, 2018

(65) Prior Publication Data

US 2018/0306608 A1 Oct. 25, 2018

(30) Foreign Application Priority Data

Apr. 19, 2017 (JP) .................................. 2017-082572

(51) Int. Cl.
*G01D 5/347* (2006.01)
*G02B 27/10* (2006.01)

(52) U.S. Cl.
CPC ..... *G01D 5/34707* (2013.01); *G01D 5/34715* (2013.01); *G01D 5/34746* (2013.01); *G02B 27/106* (2013.01); *G02B 27/1086* (2013.01)

(58) Field of Classification Search
CPC .................................. G01D 5/38; G01D 5/266
See application file for complete search history.

(56) References Cited

U.S. PATENT DOCUMENTS

| 5,249,032 A | 9/1993 | Matsui et al. | |
| 2005/0140985 A1* | 6/2005 | Takahashi | G01D 5/38 356/499 |
| 2016/0116305 A1* | 4/2016 | Miyazawa | G01D 5/38 356/499 |

FOREIGN PATENT DOCUMENTS

JP H04-184218 7/1992

* cited by examiner

*Primary Examiner* — Thanh Luu
(74) *Attorney, Agent, or Firm* — Rankin, Hill & Clark LLP

(57) ABSTRACT

An optical encoder includes a scale including a diffraction grating, a light-receiving unit configured to receive light from a light source, and an optical element located between the scale and the light-receiving unit. The optical element includes a plurality of groove portions, which are a periodic structure portion formed periodically in one face of the optical element. The plurality of groove portions is configured to divide signal diffracted light and noise diffracted light into first splitted beams traveling at a predetermined travel angle and second splitted beams traveling at a travel angle greater than the travel angle of the first splitted beams, and make a diffraction efficiency of the first splitted beams of the noise diffracted light lower than a diffraction efficiency of the first splitted beams of the signal diffracted light.

6 Claims, 7 Drawing Sheets

OPTICAL ENCODER

TECHNICAL FIELD

The present invention relates to an optical encoder.

BACKGROUND ART

An optical encoder of the related art is known. The optical encoder includes a scale provided with a diffraction grating arranged along a measurement direction and a head including a light-receiving unit that receives light emitted from a light source through the diffraction grating. The head is configured to move relative to the scale along the measurement direction thereof and detect an amount of relative movement with the scale.

In this optical encoder, the diffraction grating transforms the light emitted from the light source into a plurality of beams of diffracted light. The plurality of beams of diffracted light produce an interference pattern having the same period as that of the diffraction grating, and the light-receiving unit detects a signal from this interference pattern. The optical encoder calculates an amount of relative movement between the scale and the head from the detection result (signal) from the light-receiving unit.

The plurality of beams of diffracted light include diffracted light traveling in the same direction as the optical axis of the light emitted from the light source, diffracted light traveling at predetermined diffraction angles on both sides of the optical axis, and diffracted light traveling at diffraction angles greater than the predetermined diffraction angles on both sides of the optical axis.

Assuming the diffracted light traveling in the same direction as the optical axis is zeroth-order diffracted light, the plurality of beams of diffracted light can be ordered as ±first-order diffracted light and ±second-order diffracted light, moving from the zeroth-order diffracted light in the direction in which the diffraction angle increases.

The light-receiving unit primarily detects a signal from an interference pattern produced from the ±first-order diffracted light. Accordingly, the ±first-order diffracted light becomes signal diffracted light, and diffracted light of higher orders than the ±first-order diffracted light becomes noise diffracted light.

When the light-receiving unit is irradiated with signal diffracted light and noise diffracted light, the interference pattern produced by the signal diffracted light is distorted by the noise diffracted light and noise arises in the signal detected by the light-receiving unit. There is thus a problem in that the accuracy of the amount of relative movement calculated from the signal by the light-receiving unit drops and the optical encoder is less reliable.

In response to this, an interference-type position measurement device (optical encoder) disclosed in Patent Document 1 includes a main scale (a scale) arranged along a transmission-type diffraction grating (a diffraction grating), a light source that irradiates the main scale with light, and a photodetector (a light-receiving unit) that outputs a signal from an interference pattern produced by a plurality of diffracted light beams that have passed through the transmission-type diffraction grating.

The interference-type position measurement device is configured such that the main scale is arranged between the light source and the photodetector. Additionally, the interference-type position measurement device includes, between the light source and the main scale, a diffraction grating beam splitter and an optical block that irradiates the main scale with only the ±first-order diffracted light of the plurality of diffracted light beams passing through the diffraction grating beam splitter from the light source.

The optical block includes an integrated prism that reflects the ±first-order diffracted light toward the main scale but refracts the diffracted light aside from the ±first-order diffracted light in a direction where the main scale is not irradiated, and a zeroth-order diffracted light shielding device that physically shields zeroth-order diffracted light (that is, a diffracted light shielding device that shields diffracted light aside from ±first-order diffracted light). The integrated prism is formed as a rectangular parallelepiped that takes a direction parallel to the optical axis of the light emitted toward the diffraction grating beam splitter as a longitudinal direction. The zeroth-order diffracted light shielding device is provided within the integrated prism, and is arranged in substantially the central part of the integrated prism.

The interference-type position measurement device includes the optical block, and thus removes noise diffracted light using the zeroth-order diffracted light shielding device and the integrated prism so as to irradiate the main scale with only the ±first-order diffracted light (signal diffracted light).

CITATION LIST

Patent Documents

Patent Document 1: JP 2619566 B

SUMMARY OF INVENTION

Technical Problem

However, in this optical encoder, providing the integrated prism and the diffracted light shielding device that shields diffracted light aside from the ±first-order diffracted light makes it necessary to provide a space for reflecting and refracting the plurality of diffracted light beams between the light source and the scale. There is thus a problem in that the structure of the optical encoder becomes large.

An object of the invention is to provide an optical encoder that can suppress a situation in which a light-receiving unit is irradiated with noise diffracted light while suppressing an increase in the size of the optical encoder.

Solution to Problem

An optical encoder according to an aspect of the invention includes: a light source configured to emit collimated light; a scale including a diffraction grating configured to diffract light emitted from the light source into a plurality of diffracted light beams; a light-receiving unit configured to receive signal diffracted light and noise diffracted light resulting from diffraction by the diffraction grating, the signal diffracted light traveling at a predetermined diffraction angle on both sides of an optical axis of the light emitted from the light source and the noise diffracted light traveling at a diffraction angle greater than a diffraction angle of the signal diffracted light on both sides of the optical axis of the light emitted from the light source; and an optical element located between the scale and the light-receiving unit. The optical element includes a periodic structure portion formed periodically on one face of the optical element facing the scale or the light-receiving unit. The periodic structure portion divides the signal diffracted light and the noise diffracted light into first splitted beams traveling at a predetermined travel angle and second splitted beams traveling at a travel angle greater than a travel angle of the first splitted beams, and makes a diffraction efficiency of the first splitted beams of the noise diffracted light lower than a diffraction efficiency of the first splitted beams of the signal diffracted light.

The plurality of diffracted light beams traveling toward the optical element from the diffraction grating of the scale can be ordered as ±first-order diffracted light and ±second-order diffracted light, in the direction in which the diffraction angle increases, on the basis of the optical axis of the light emitted from the light source to the scale.

In this invention, of the plurality of diffracted light beams, ±first-order diffracted light corresponds to the signal diffracted light and ±second and higher orders of diffracted light correspond to the noise diffracted light.

The "diffraction angles" are angles, based on the optical axis of the light from the light source, at which the signal diffracted light and the noise diffracted light diffracted by the diffraction grating of the scale travel toward the optical element. The "travel angles" are angles, based on the optical axis of the light from the light source, at which the first splitted beams and the second splitted beams of the signal diffracted light and the noise diffracted light split by the periodic structure portion of the optical element travel within the optical element.

The "diffraction efficiency" is a ratio between the signal diffracted light and the noise diffracted light incident on the optical element, and the first splitted beams and the second splitted beams of the signal diffracted light and the noise diffracted light traveling within the optical element.

According to the invention, with respect to the first splitted beams and the second splitted beams of the signal diffracted light, and the first splitted beams and the second splitted beams of the noise diffracted light, split by the periodic structure portion, the optical element makes the diffraction efficiency of the first splitted beams of the noise diffracted light lower than the diffraction efficiency of the first splitted beams of the signal diffracted light. Accordingly, the noise diffracted light with which the light-receiving unit is irradiated can be suppressed, and the S/N ratio can be improved as compared to a case where the periodic structure portion is not used.

Additionally, the optical element can suppress the noise diffracted light with which the light-receiving unit is irradiated by using the periodic structure portion formed in the one face of the optical element facing the scale or the light-receiving unit. It is thus not necessary to provide a space for reflecting and refracting the plurality of diffracted light beams, and shielding the plurality of diffracted light beams, between the scale and the light-receiving unit.

Accordingly, the optical element can suppress an increase in the size of the optical encoder, and can suppress a situation in which the light-receiving unit is irradiated with the noise diffracted light.

Here, it is preferable that the optical element include the periodic structure portion formed on one face of the optical element facing the scale, and a smooth surface that faces the light-receiving unit and is parallel to a direction in which the diffraction grating is arranged; and that the smooth surface fully reflect the second splitted beams.

According to the invention, the optical element includes the periodic structure portion formed in the one face of the optical element facing the scale, and the smooth surface, which faces the light-receiving unit and is parallel to the direction in which the diffraction grating is arranged. As such, the second splitted beams of the signal diffracted light and the noise diffracted light produced by the periodic structure portion can be fully reflected, which makes it possible to suppress a situation in which the light-receiving unit is irradiated by the second splitted beams.

Accordingly, the optical element can further suppress a situation in which the light-receiving unit is irradiated with the noise diffracted light.

Here, it is preferable that the periodic structure portion be a plurality of groove portions formed having a cross-sectional square wave shape.

According to this configuration, the periodic structure portion is a plurality of grooves formed having a cross-sectional square wave shape, and thus the diffracted light beams with which the optical element is irradiated can be diffracted at a higher diffraction efficiency than in a case where the periodic structure portion is formed having a different shape. The optical encoder can thus stably obtain the signal diffracted light.

Additionally, it is preferable that the periodic structure portion be plurality of groove portions formed having a cross-sectional sine wave shape.

According to this configuration, the periodic structure portion is a plurality of grooves formed having a cross-sectional sine wave shape, and thus the plurality of diffracted light beams with which the optical element is irradiated can be diffracted at a higher diffraction efficiency than in a case where the periodic structure portion is formed having a different shape. The optical encoder can thus stably obtain the signal diffracted light.

DESCRIPTION OF EMBODIMENTS

First Embodiment

A first embodiment of the invention will be described hereinafter on the basis of the drawings.

Figure 1:
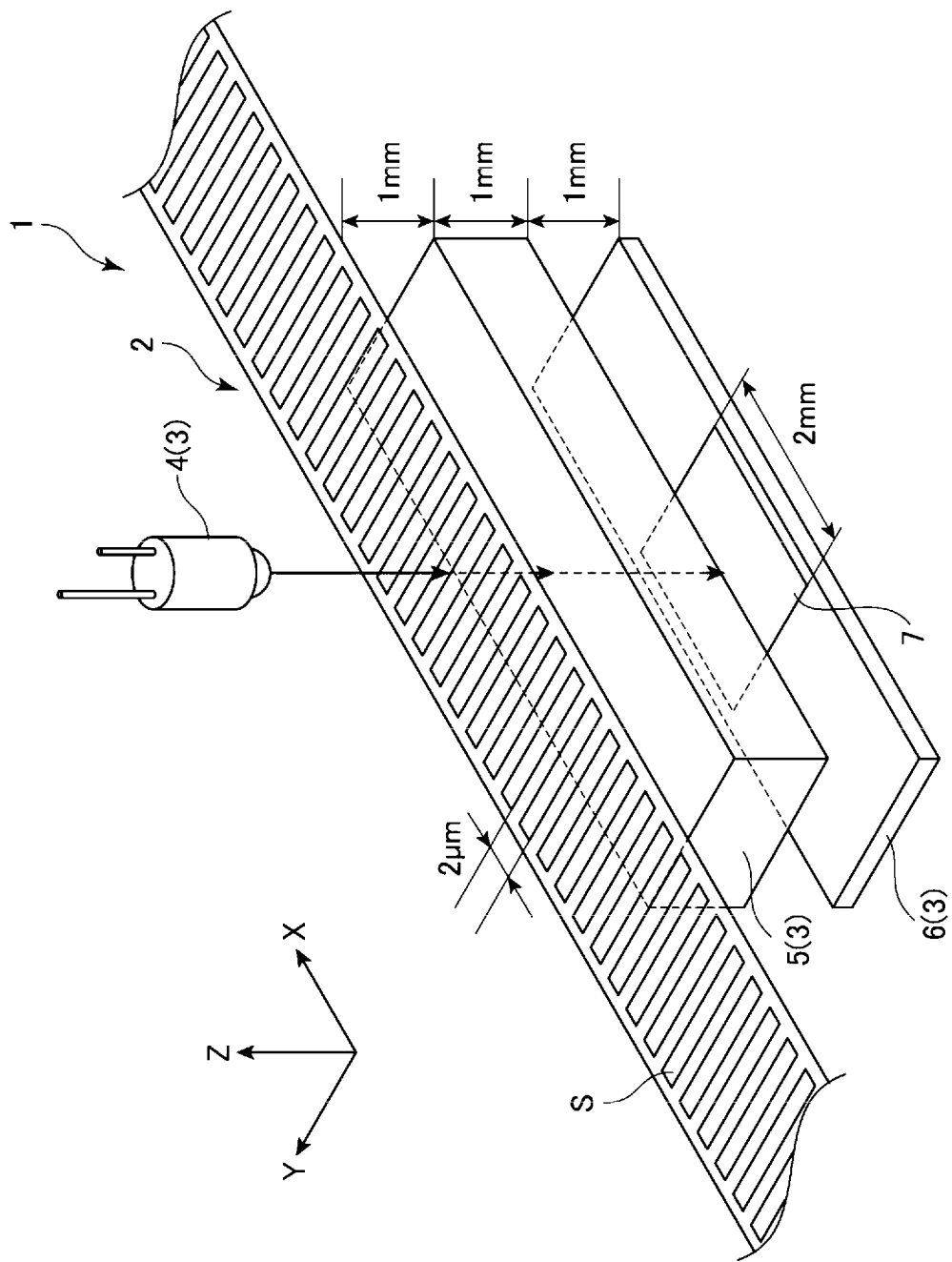
FIG. 1 is a perspective view of an optical encoder according to a first embodiment.

FIG. 1 is a perspective view of an optical encoder according to the first embodiment.

As illustrated in FIG. 1, an optical encoder 1 is a linear encoder including a long scale 2 including a diffraction grating S along a measurement direction and a head 3 that moves along the scale 2 and obtains position information from an amount of relative movement with the scale 2.

In the following descriptions and in the drawings, the longitudinal direction of the scale 2 (the measurement direction) may indicate the X direction, the latitudinal direction may indicate the Y direction, and the height direction may indicate the Z direction.

The head 3 includes a light source 4 that emits collimated light, an optical element 5 that allows a plurality of diffracted light beams from the diffraction grating S of the scale 2 to pass through, and a light-receiving unit 6 that detects an interference pattern generated by the scale 2 and the optical element 5 and outputs a signal. The head 3 including these elements is provided capable of extending and retracting in the X direction as a single entity relative to the scale 2.

The scale 2 is formed from a transmissive member, such as glass, that transmits light from the light source 4. The diffraction grating S, arranged at a period of 2 μm along the X direction, is provided on one face of the scale 2. The diffraction grating S diffracts the light emitted from the light source 4 into a plurality of diffracted light beams.

The light source 4 emits the collimated light perpendicular to the one face of the scale 2 (in the −Z direction). The wavelength of the light emitted by the light source 4 at this time is 700 nm. A Light Emitting Diode (LED), for example, is used as the light source 4. However, the light source 4 is not limited to an LED, and any desired light source may be used.

The optical element 5 is formed from glass that transmits the plurality of diffracted light beams from the diffraction grating S of the scale 2. The optical element 5 is formed having a thickness (in the Z direction) of 1 mm. The optical element 5 is located between the scale 2 and the light-receiving unit 6. The optical element 5 is arranged at a position separated from the scale 2 by 1 mm, and is arranged at a position separated from the light-receiving unit 6 by 1 mm. The light-receiving unit 6 includes a light-receiving part 7 that receives the plurality of diffracted light beams passing through the scale 2 and the optical element 5 and detects a signal from an interference pattern produced by the diffracted light.

The light-receiving part 7 is formed having a width of 2 mm in the measurement direction (the X direction). A Photo Diode Array (PDA) is used for the light-receiving part 7, which is arranged facing the optical element 5 on the −Z direction side thereof so as to overlap with the optical element 5. In other words, the scale 2 and the light-receiving part 7 are arranged facing each other and overlapping each other with the optical element 5 interposed therebetween.

A PDA is a detector having a characteristic of being able to measure a plurality of interference patterns at once. However, the light-receiving part 7 is not limited to a PDA, and any detector may be used, such as a Position Sensitive Detector (PSD) or a Charge-Coupled Device (CCD).

Figure 2:
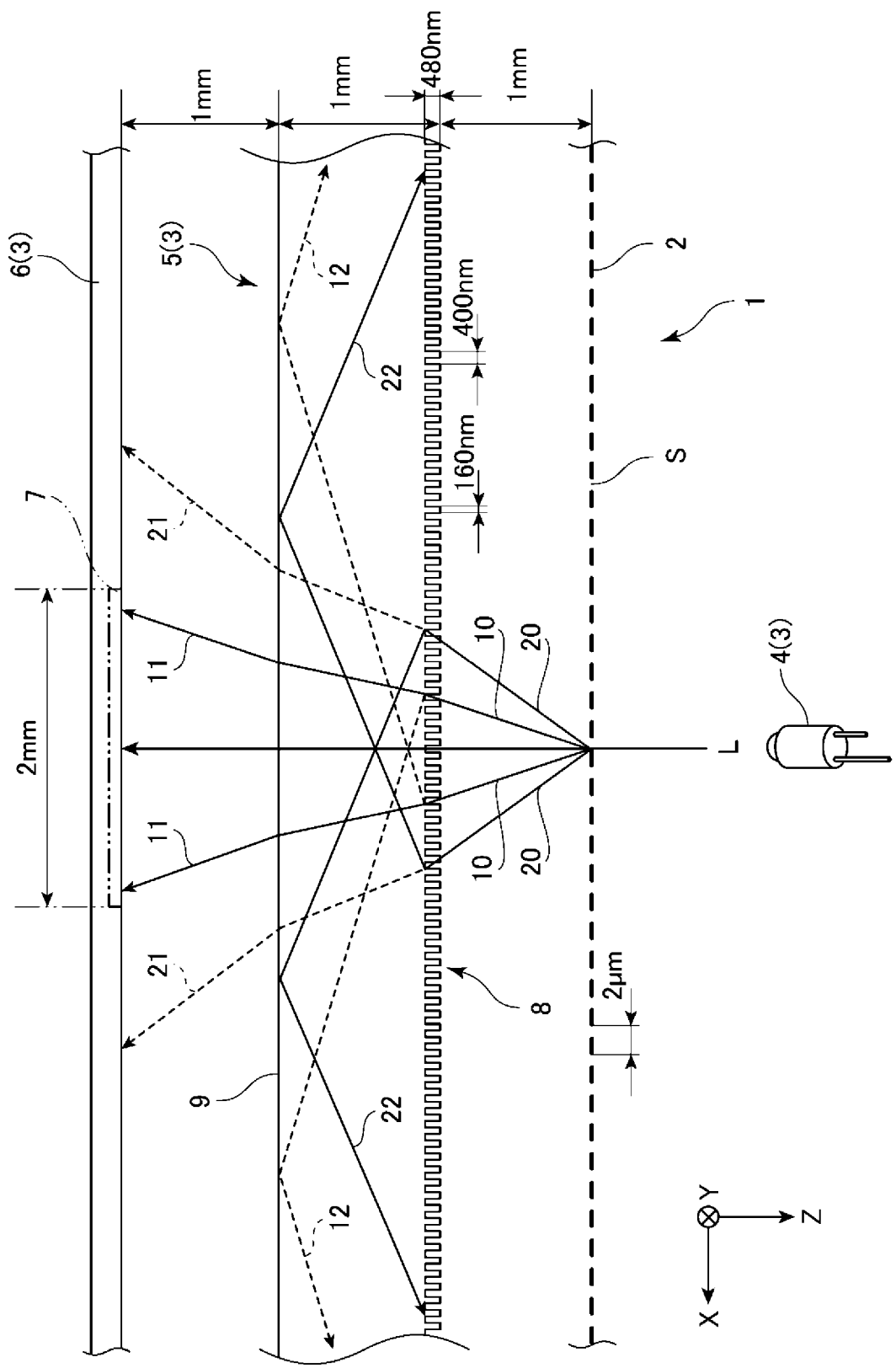
FIG. 2 is a diagram illustrating signal diffracted light and noise diffracted light in the optical encoder.

FIG. 2 is a diagram illustrating signal diffracted light and noise diffracted light in the optical encoder.

As illustrated in FIG. 2, the optical element 5 includes a plurality of groove portions 8, which are a periodic structure portion, formed in the face of the optical element 5 facing the scale 2, and a smooth surface 9, which faces the light-receiving unit 6 and is parallel to the direction in which the diffraction grating S is arranged (the X direction).

The plurality of groove portions 8 are formed having a cross-sectional square wave shape. Specifically, the plurality of groove portions 8 are formed having a width of 160 nm, a depth of 480 nm, and a period of 400 nm.

The plurality of diffracted light beams are diffracted by the diffraction grating S of the scale 2 into signal diffracted light 10 traveling at a predetermined diffraction angle on both sides of an optical axis L of the light emitted from the light source 4, and noise diffracted light 20 traveling at a diffraction angle greater than that of the signal diffracted light 10 on both sides of the optical axis L of the light emitted from the light source 4.

Here, the "diffraction angles" are angles, based on the optical axis L of the light from the light source 4, at which the signal diffracted light 10 and the noise diffracted light 20 diffracted by the diffraction grating S of the scale 2 travel toward the optical element 5.

The plurality of groove portions 8 split the signal diffracted light 10 into first splitted beams 11 traveling at a predetermined travel angle (solid line arrows) and second splitted beams 12 traveling at a greater travel angle than that of the first splitted beams 11 (broken line arrows). Additionally, the plurality of groove portions 8 split the noise diffracted light 20 into first splitted beams 21 traveling at a predetermined travel angle (broken line arrows) and second splitted beams 22 traveling at a greater travel angle than that of the first splitted beams 21 (solid line arrows).

Here, the "travel angles" are angles, based on the optical axis L of the light from the light source 4, at which the first splitted beams 11 and 21 and the second splitted beams 12 and 22 of the signal diffracted light 10 and the noise diffracted light 20 split by the plurality of groove portions 8 of the optical element 5 travel within the optical element 5.

The solid line arrows and broken line arrows illustrated in FIG. 2 indicate the directions in which the first splitted beams 11 and 21 and the second splitted beams 12 and 22 of the signal diffracted light 10 and the noise diffracted light 20 travel, and diffraction efficiencies of each. The "diffraction efficiency" is a ratio between the signal diffracted light 10 and the noise diffracted light 20 incident on the optical element 5, and the first splitted beams 11 and 21 and the second splitted beams 12 and 22 of the signal diffracted light 10 and the noise diffracted light 20 traveling within the optical element 5.

The solid line arrows indicate a higher diffraction efficiency than the broken line arrows, whereas the broken line arrows indicate a lower diffraction efficiency than the solid line arrows.

The smooth surface 9 is formed on the face that faces the light-receiving unit 6, and fully reflects the second splitted beams 12 and 22.

With the configuration of the optical encoder 1 as described above, the following results are obtained when the diffraction efficiencies of the first splitted beams 11 and the second splitted beams 12 of the signal diffracted light 10 and the first splitted beams 21 and the second splitted beams 22 of the noise diffracted light 20 are calculated through Rigorous coupled-wave analysis (RCWA).

The signal diffracted light 10 travels from the scale 2 toward the optical element 5 at a diffraction angle of 20.48 degrees. The signal diffracted light 10 diffracted by the multiple groove portions 8 is split into the first splitted beams 11 and the second splitted beams 12.

The diffraction efficiency of the first splitted beams 11 of the signal diffracted light 10 is 94.0%, and the diffraction efficiency of the second splitted beams 12 of the signal diffracted light 10 is 5.0%. The second splitted beams 12 of the signal diffracted light 10 travel at a travel angle of 69.0 degrees within the optical element 5.

Here, diffracted light traveling at a travel angle of greater than or equal to 41.8 degrees within the optical element 5, which is formed from glass, is reflected by the smooth surface 9, which is the interface between the glass (the optical element 5) and the air, and is thus not emitted toward the light-receiving unit 6. In other words, diffracted light traveling at a travel angle greater than or equal to 41.8 degrees within the optical element 5 is fully reflected by the smooth surface 9.

The second splitted beams 12 of the signal diffracted light 10 travel at a travel angle of 69.0 degrees within the optical element 5, and are therefore fully reflected by the smooth surface 9.

The noise diffracted light 20 travels from the scale 2 toward the optical element 5 at a diffraction angle of 44.43 degrees. The noise diffracted light 20 diffracted by the plurality of groove portions 8 is split into the first splitted beams 21 and the second splitted beams 22.

The diffraction efficiency of the first splitted beams 21 of the noise diffracted light 20 is 14.7%, and the diffraction efficiency of the second splitted beams 22 of the noise diffracted light 20 is 85.1%. The second splitted beams 22 of the noise diffracted light 20 travel at a travel angle of 44.4 degrees within the optical element 5. Diffracted light traveling at a travel angle of greater than or equal to 41.8 degrees within the optical element 5 is fully reflected by the smooth surface 9, and thus the second splitted beams 22 of the noise diffracted light 20 are fully reflected by the smooth surface 9.

As a result, the optical element 5 can reduce the influence of the noise diffracted light 20 with which the light-receiving unit 6 is irradiated to 15.6%.

Accordingly, by using the optical element 5 in which the plurality of groove portions 8 are formed, the optical encoder 1 can improve the S/N ratio, as compared to a case where the optical element 5 is not used.

Figure 3:
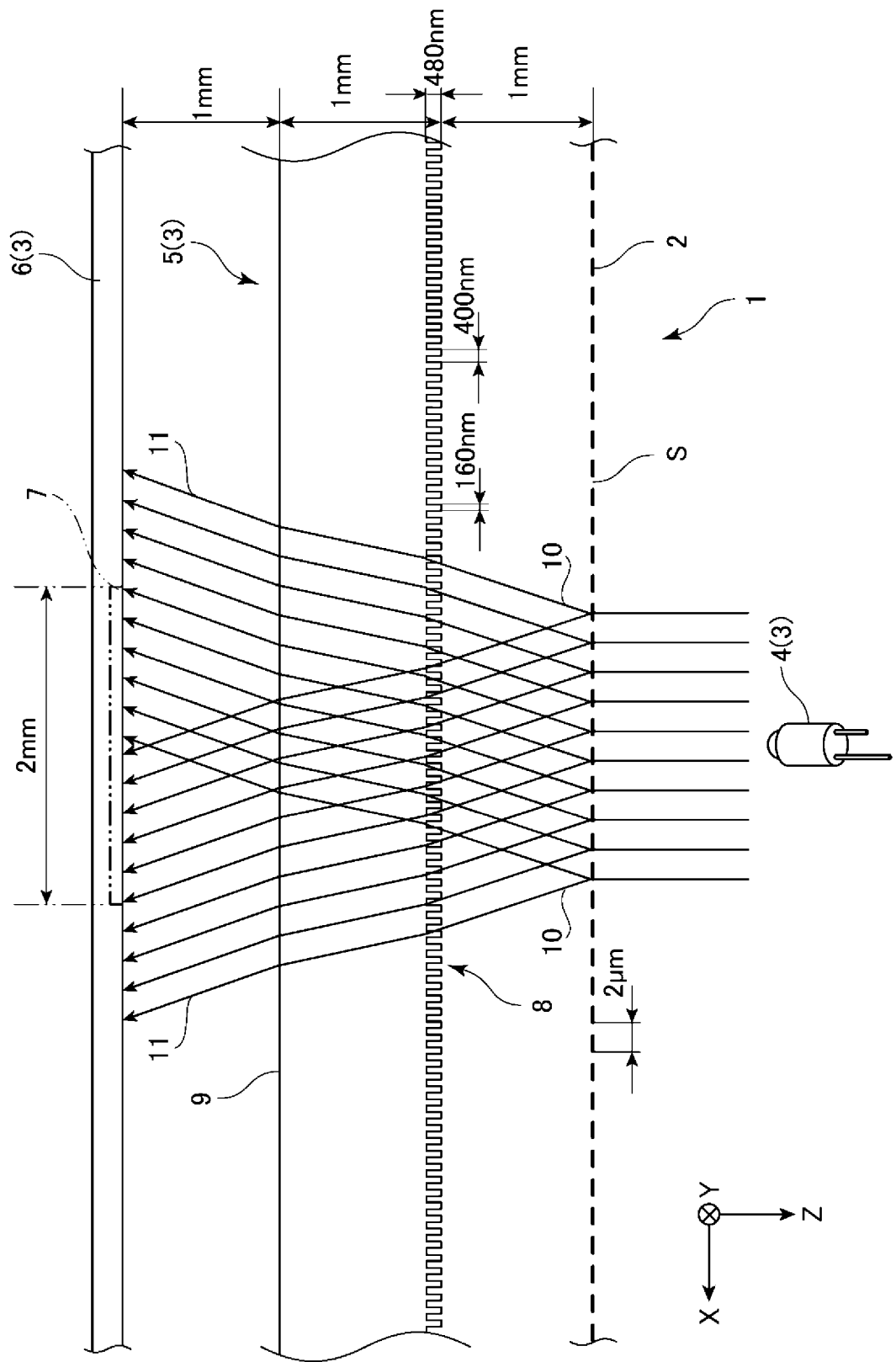
FIG. 3 is a diagram illustrating first splitted beams of the signal diffracted light in the optical encoder.
Figure 4:
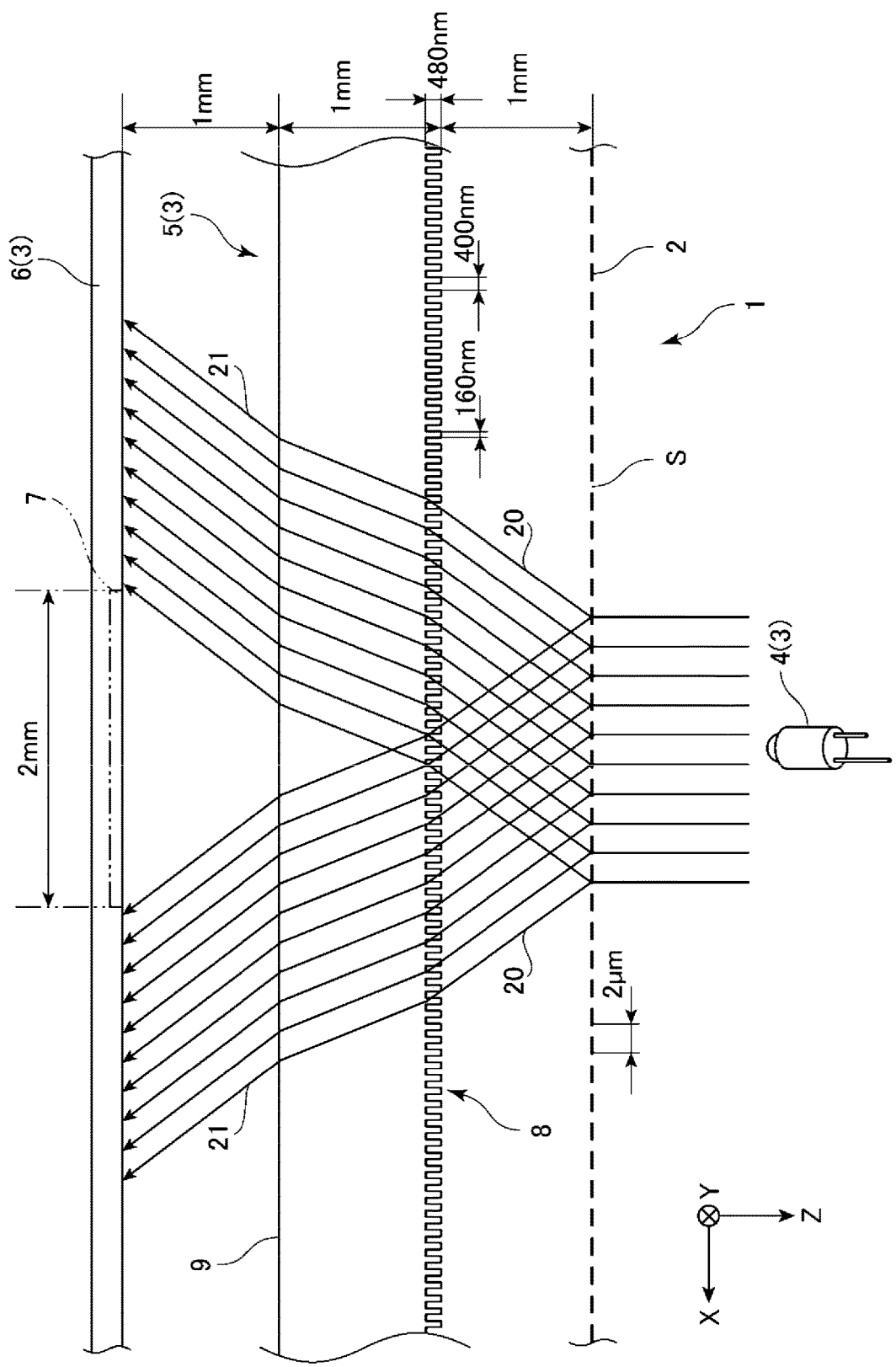
FIG. 4 is a diagram illustrating first splitted beams of the noise diffracted light in the optical encoder.
Figure 5:
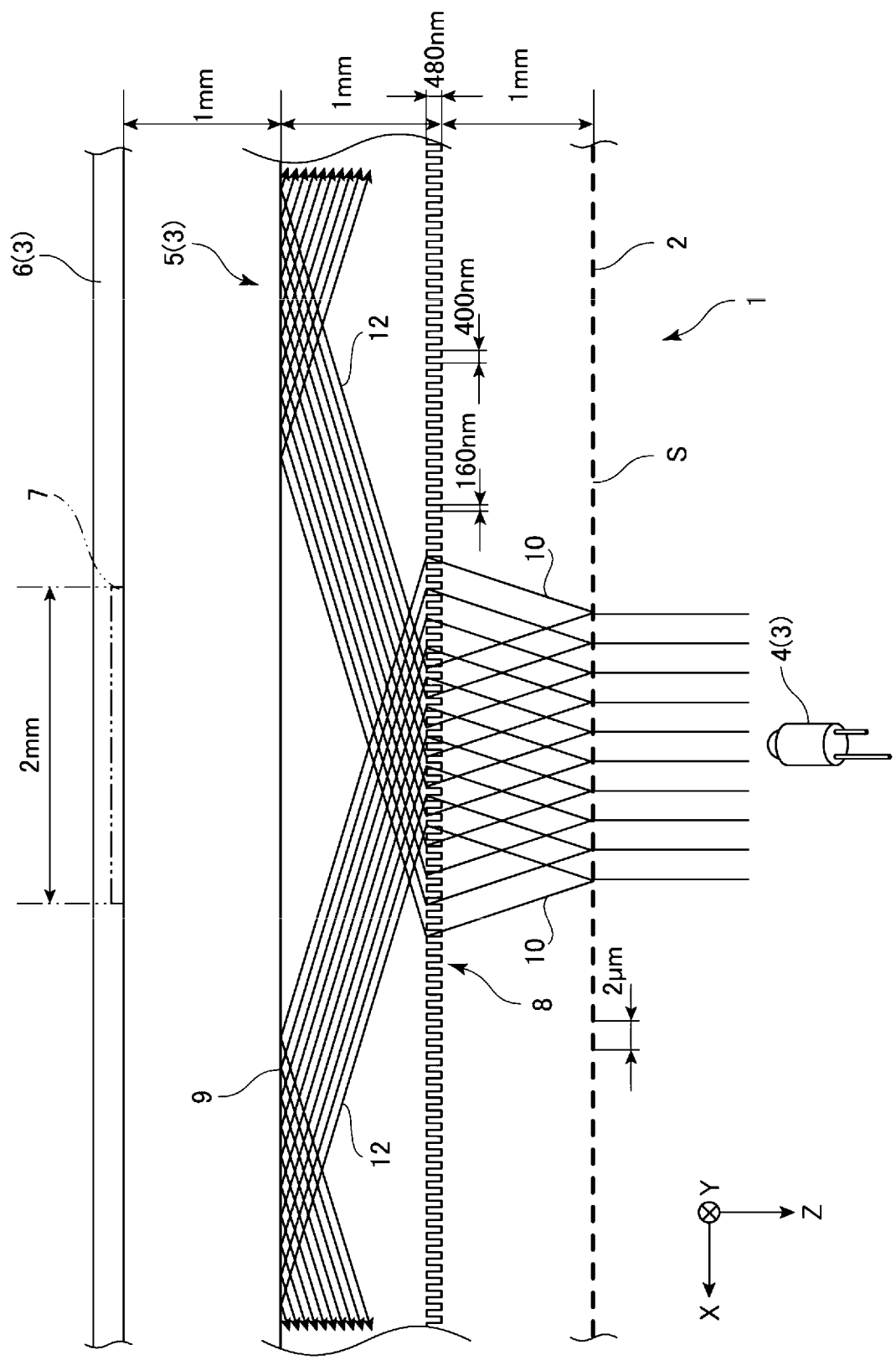
FIG. 5 is a diagram illustrating second splitted beams of the signal diffracted light in the optical encoder.
Figure 6:
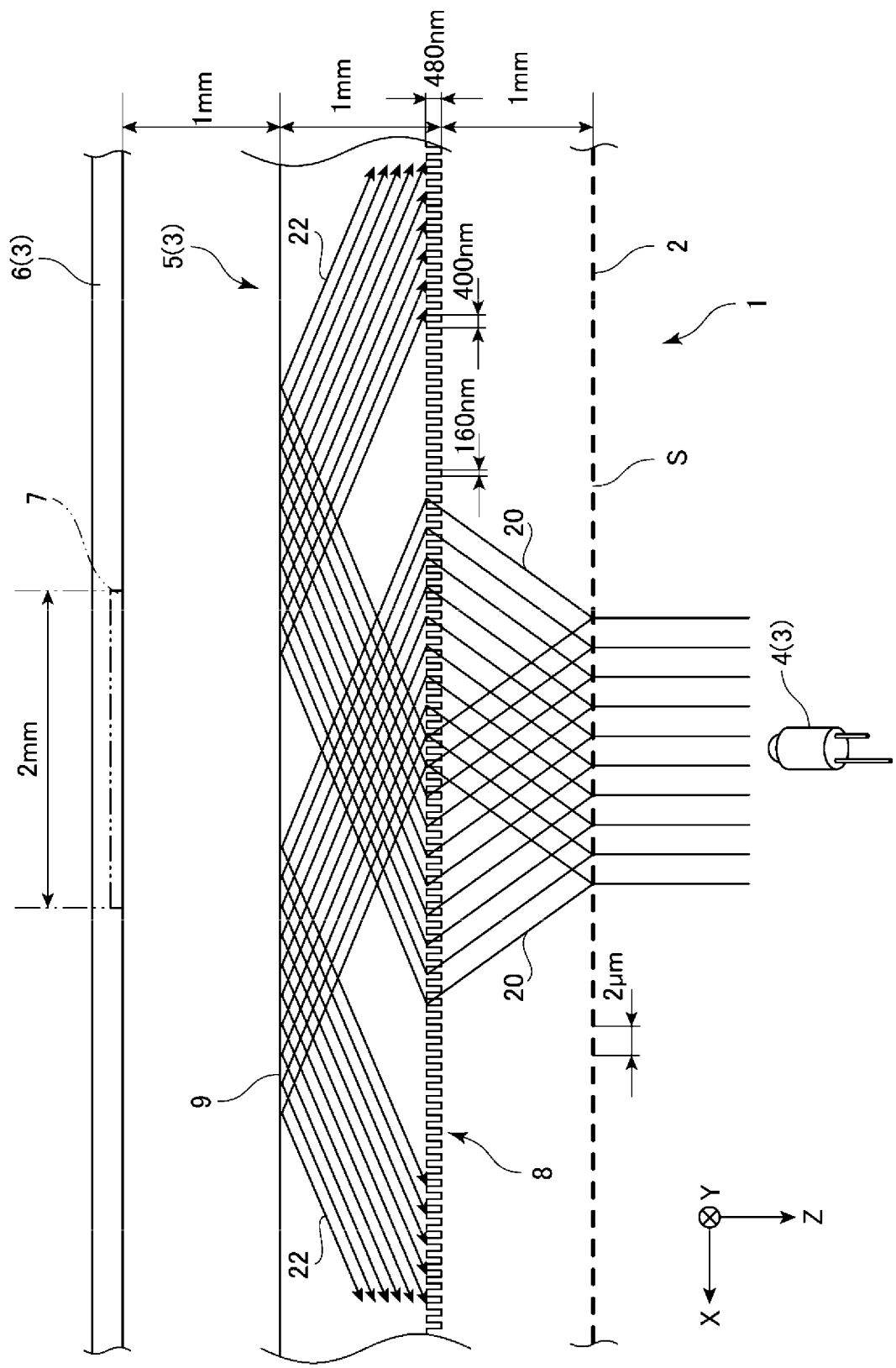
FIG. 6 is a diagram illustrating second splitted beams of the noise diffracted light in the optical encoder.

FIGS. 3 to 6 are diagrams illustrating the signal diffracted light and the noise diffracted light in the optical encoder. Specifically, FIG. 3 is a diagram illustrating the first splitted beams 11 of the signal diffracted light 10, FIG. 4 is a diagram illustrating the first splitted beams 21 of the noise diffracted light 20, FIG. 5 is a diagram illustrating the second splitted beams 12 of the signal diffracted light 10, and FIG. 6 is a diagram illustrating the second splitted beams 22 of the noise diffracted light 20.

Optical paths of the signal diffracted light 10 and the noise diffracted light 20 arising due to the optical element 5 being used will be described.

As illustrated in FIG. 3, the light-receiving part 7 is irradiated with the first splitted beams 11 of the signal diffracted light 10 through the plurality of groove portions 8 of the optical element 5 as the signal diffracted light 10. However, as illustrated in FIG. 4, although the first splitted beams 21 of the noise diffracted light 20 do reach the light-receiving unit 6, the light-receiving part 7 is almost entirely unirradiated by the first splitted beams 21 of the noise diffracted light 20. The diffraction efficiency of first splitted beams 21 of the noise diffracted light 20 has a greater rate of decrease than the diffraction efficiency of the first splitted beams 11 of the signal diffracted light 10. As such, using the plurality of groove portions 8, the optical element 5 can reduce the influence of the first splitted beams 21 of the noise diffracted light 20 with which the light-receiving unit 6 is irradiated.

As illustrated in FIG. 5, the second splitted beams 12 of the signal diffracted light 10 are diffracted by the plurality of groove portions 8 of the optical element 5 to a greater travel angle than that of the first splitted beams 11 of the signal diffracted light 10, and travel angles of the second splitted beams 12 of the signal diffracted light 10 are greater than or equal to 41.8 degrees. As a result, the second splitted beams 12 of the signal diffracted light 10 are thus fully reflected by the smooth surface 9. Additionally, as illustrated in FIG. 6, the second splitted beams 22 of the noise diffracted light 20 are also diffracted by the plurality of groove portions 8 of the optical element 5 to a greater travel angle than that of the first splitted beams 21 of the noise diffracted light 20, and travel angles of the second splitted beams 22 of the noise diffracted light 20 are greater than or equal to 41.8 degrees. As a result, the second splitted beams 22 of the noise diffracted light 20 are thus fully reflected by the smooth surface 9. The second splitted beams 22 of the noise diffracted light 20, which have a higher diffraction efficiency than that of the first splitted beams 21 of the noise diffracted light 20, are fully reflected by the smooth surface 9, and thus the smooth surface 9 of the optical element 5 can suppress the noise diffracted light 20 with which the light-receiving unit 6 is irradiated.

According to this embodiment, the following effects can be achieved.

(1) With respect to the first splitted beams 11 and the second splitted beams 12 of the signal diffracted light 10, and the first splitted beams 21 and the second splitted beams 22 of the noise diffracted light 20, split by the plurality of groove portions 8, which are a periodic structure portion, the optical element 5 makes the diffraction efficiency of the first splitted beams 21 of the noise diffracted light 20 lower than the diffraction efficiency of the first splitted beams 11 of the signal diffracted light 10. Accordingly, the noise diffracted light 20 with which the light-receiving unit 6 is irradiated can be suppressed, and the S/N ratio can be improved as compared to a case where the plurality of groove portions 8, which are a periodic structure portion, are not used.

(2) The optical element 5 can suppress the noise diffracted light 20 with which the light-receiving unit 6 is irradiated by using the plurality of groove portions 8, which are a periodic structure portion, formed in the one face of the optical element 5 facing the scale 2. It is thus not necessary to provide a space for reflecting and refracting the diffracted light, and shielding the diffracted light, between the scale 2 and the light-receiving unit 6.

Accordingly, the optical element 5 can suppress an increase in the size of the optical encoder 1, and can suppress a situation in which the light-receiving unit 6 is irradiated with the noise diffracted light 20.

(3) The optical element 5 includes the plurality of groove portions 8, which are a periodic structure portion, formed in the one face of the optical element 5 facing the scale 2, and the smooth surface 9, which faces the light-receiving unit 6 and is parallel to the direction in which the diffraction grating S is arranged (the X direction). As such, the second splitted beams 12 and 22 of the signal diffracted light 10 and the noise diffracted light 20 produced by the plurality of groove portions 8 can be fully reflected, which makes it possible to suppress a situation in which the light-receiving unit 6 is irradiated by the second splitted beams 12 and 22.

Accordingly, the optical element 5 can further suppress a situation in which the light-receiving unit 6 is irradiated with the noise diffracted light 20.

(4) The plurality of groove portions 8, which are a periodic structure portion, are formed having a cross-sectional square wave shape, and thus the plurality of diffracted light beams with which the optical element 5 is irradiated can be diffracted at a higher diffraction efficiency than in a case where the plurality of groove portions 8 are formed having a different shape. The optical encoder 1 can thus stably obtain the signal diffracted light.

Second Embodiment

A second embodiment of the invention will be described hereinafter on the basis of the drawings. Note that in the following descriptions, parts that have already been described will be given the same reference signs, and descriptions thereof will be omitted.

Figure 7:
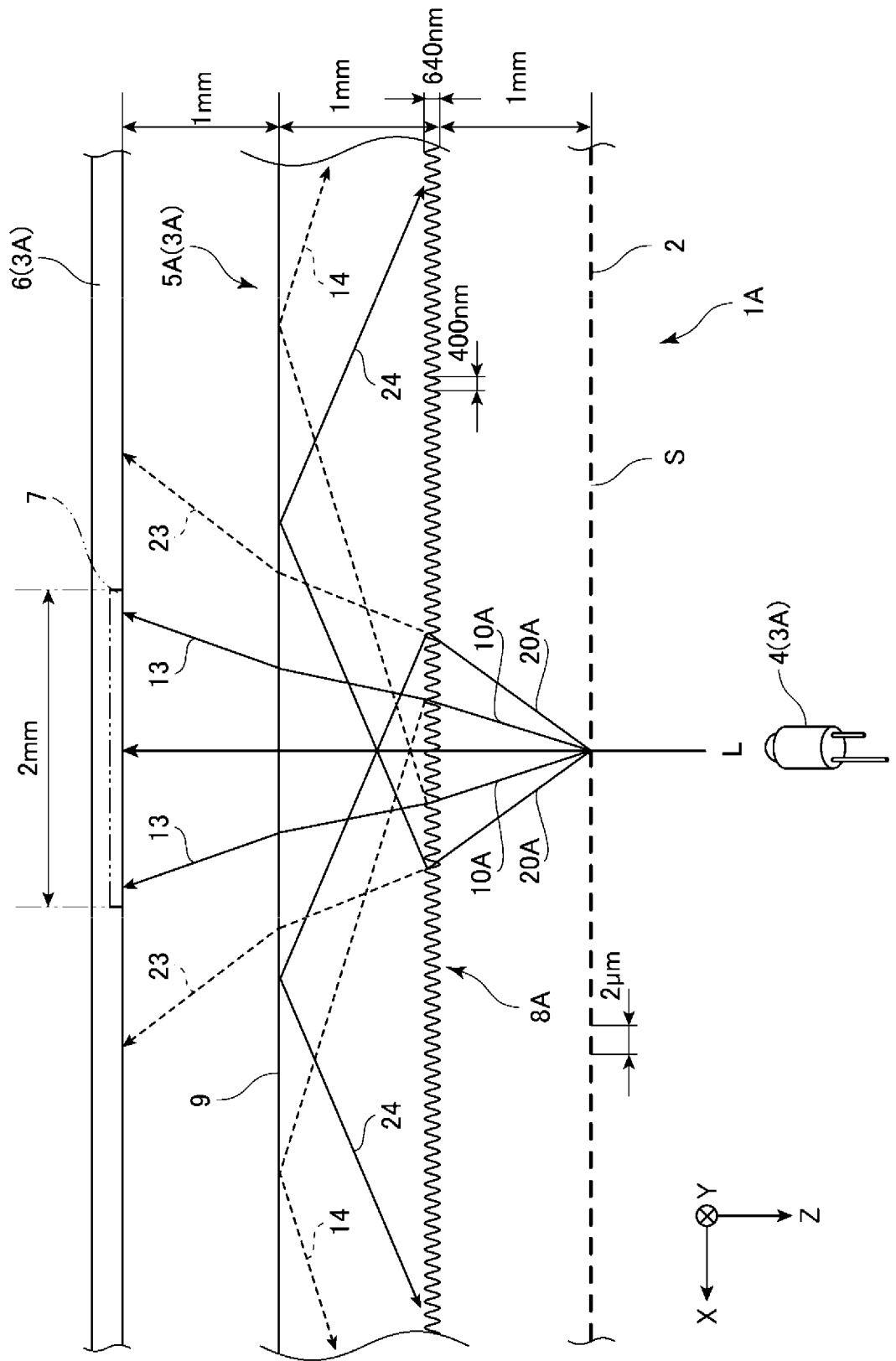
FIG. 7 is a diagram illustrating an optical encoder according to a second embodiment.

FIG. 7 is a diagram illustrating an optical encoder according to the second embodiment.

The head 3 of the optical encoder 1 according to the first embodiment includes the optical element 5. However, as illustrated in FIG. 7, a head 3A of an optical encoder 1A according to this embodiment differs from the head 3 according to the first embodiment in that the head 3A includes an optical element 5A.

Furthermore, the optical element 5 according to the first embodiment includes the plurality of groove portions 8, which are a periodic structure portion formed having a cross-sectional square wave shape. However, the optical element 5A according to this embodiment differs from the optical element 5 according to the first embodiment in that the optical element 5A includes a plurality of groove portions 8A, which are a periodic structure portion formed having a cross-sectional sine wave shape.

The plurality of groove portions 8A are formed having a cross-sectional sine wave shape. Specifically, the plurality of groove portions 8A are formed having a depth of 640 nm and a period of 400 nm.

With the configuration of the optical encoder 1A according to this embodiment, the following results are obtained when the diffraction efficiencies of first splitted beams 13 (solid line arrows) and second splitted beams 14 (broken line arrows) of signal diffracted light 10A and first splitted beams 23 (broken line arrows) and second splitted beams 24 (solid line arrows) of noise diffracted light 20A are calculated through Rigorous coupled-wave analysis.

The signal diffracted light 10A travels from the scale 2 toward the optical element 5A at a diffraction angle of 20.48 degrees. The signal diffracted light 10A diffracted by the plurality of groove portions 8A is split into the first splitted beams 13 and the second splitted beams 14.

The diffraction efficiency of the first splitted beams 13 of the signal diffracted light 10A is 96.3%, and the diffraction efficiency of the second splitted beams 14 of the signal diffracted light 10A is 3.2%. The second splitted beams 14 of the signal diffracted light 10A travel at a travel angle of 69.0 degrees within the optical element 5A. Diffracted light traveling at a travel angle of greater than or equal to 41.8 degrees within the optical element 5A is fully reflected by the smooth surface 9, and thus the second splitted beams 14 of the signal diffracted light 10A are fully reflected by the smooth surface 9.

The noise diffracted light 20A travels from the scale 2 toward the optical element 5A at a diffraction angle of 44.43 degrees. The noise diffracted light 20A diffracted by the plurality of groove portions 8A is split into the first splitted beams 23 and the second splitted beams 24.

The diffraction efficiency of the first splitted beams 23 of the noise diffracted light 20A is 38.5%, and the diffraction efficiency of the second splitted beams 24 of the noise diffracted light 20A is 61.0%. The second splitted beams 24 of the noise diffracted light 20A travel at a travel angle of 44.4 degrees within the optical element 5A. Diffracted light traveling at a travel angle of greater than or equal to 41.8 degrees within the optical element 5A is fully reflected by the smooth surface 9, and thus the second splitted beams 24 of the noise diffracted light 20A are fully reflected by the smooth surface 9.

As a result, the optical element 5A can reduce the influence of the noise diffracted light 20A with which the light-receiving unit 6 is irradiated to 40.0%.

Accordingly, by using the optical element 5A in which the plurality of groove portions 8A are formed, the optical encoder 1A can improve the S/N ratio, as compared to a case where the optical element 5A is not used.

According to this embodiment, the following effects can be achieved in addition to the same effects as (1) to (3) described in the first embodiment.

(4) The plurality of groove portions 8A, which are a periodic structure portion, are formed having a cross-sectional sine wave shape, and thus the plurality of diffracted light beams with which the optical element 5A is irradiated can be diffracted at a higher diffraction efficiency than in a case where the plurality of groove portions 8A are formed having a different shape. The optical encoder 1A can thus stably obtain the signal diffracted light.

Variations on Embodiments

Note that the invention is not limited to the foregoing embodiments, and variations, improvements, and the like that fall within a scope in which the object of the present invention can be achieved are also included within the invention.

For example, although the foregoing embodiments describe applying the invention in the optical encoder 1 or 1A, which is a linear encoder, the encoder may instead be a rotary encoder; the shape of the detector, the detection method, and the like are not particularly limited as long as the encoder is an optical encoder.

Although the optical element 5 or 5A is formed from glass in the foregoing embodiments, the optical element 5 or 5A may be formed from a transmissive member aside from glass, and may be formed having any desired thickness. Additionally, although the groove width, groove depth, and period are set for the plurality of groove portions 8 or 8A, which are periodic structure portions, these dimensions may be set to any desired numerical values. Additionally, although the plurality of groove portions 8 or 8A are formed having a cross-sectional square wave shape or a cross-sectional sine wave shape, the plurality of groove portions 8 or 8A may be formed having another shape. Furthermore, the plurality of groove portions 8 or 8A may be formed in the one face that faces the light-receiving unit 6.

In other words, it is sufficient for the optical element to include a periodic structure portion formed periodically in one face that faces the scale or the light-receiving unit, as long as the periodic structure portion splits the signal diffracted light and the noise diffracted light into first splitted beams that traveling at a predetermined travel angle and second splitted beams traveling at a travel angle greater than the travel angle of the first splitted beams, and make the diffraction efficiency of the first splitted beams of the noise diffracted light lower than the diffraction efficiency of the first splitted beams of the signal diffracted light.

Although the optical element 5 or 5A includes the smooth surface 9 on the one face that faces the light-receiving unit 6 (the light-receiving part 7) in the foregoing embodiments, the smooth surface 9 may be provided on the one face that faces the scale 2.

Additionally, although the light-receiving part 7 is set to a width of 2 mm along the X direction in the foregoing embodiments, the light-receiving part 7 may have any desired width. Furthermore, although the scale 2 and the light-receiving unit 6 are each arranged at a position separated from the optical element 5 or 5A by 1 mm, the scale 2 and the light-receiving unit 6 may be arranged so as to be separated from the optical element 5 or 5A by any desired distance.

INDUSTRIAL APPLICABILITY

As described above, the invention can be applied favorably in an optical encoder that can suppress a situation in which a light-receiving unit is irradiated with noise diffracted light while suppressing an increase in the size of the optical encoder.

REFERENCE SIGNS LIST

1, 1A Optical encoder
2 Scale
4 Light source
5, 5A Optical element
6 Light-receiving unit
8, 8A Multiple groove portions (periodic structure portion)
9 Smooth surface
10, 10A Signal diffracted light
11, 13 First splitted beams
12, 14 Second splitted beams
20, 20A Noise diffracted light
21, 23 First splitted beams
22, 24 Second splitted beams
S Diffraction grating

The invention claimed is:

1. An optical encoder comprising:
   a light source configured to emit collimated light;
   a scale including a diffraction grating configured to diffract light emitted from the light source into a plurality of diffracted light beams;
   a light-receiving unit configured to receive signal diffracted light and noise diffracted light resulting from diffraction by the diffraction grating, the signal diffracted light traveling at a predetermined diffraction angle on both sides of an optical axis of the light emitted from the light source and the noise diffracted light traveling at a diffraction angle greater than a diffraction angle of the signal diffracted light on both sides of the optical axis of the light emitted from the light source; and
   an optical element located between the scale and the light-receiving unit,
   wherein the optical element includes a periodic structure portion formed periodically on one face of the optical element facing the scale or the light-receiving unit;
   the periodic structure portion is configured to divide the signal diffracted light and the noise diffracted light into first splitted beams traveling at a predetermined travel angle and second splitted beams traveling at a travel angle greater than a travel angle of the first splitted beams, and make a diffraction efficiency of the first splitted beams of the noise diffracted light lower than a diffraction efficiency of the first splitted beams of the signal diffracted light; and
   the diffraction grating has a period larger than a period of the periodic structure portion.

2. The optical encoder according to claim 1,
   wherein the optical element includes the periodic structure portion formed on one face of the optical element facing the scale, and a smooth surface that faces the light-receiving unit and is parallel to a direction in which the diffraction grating is arranged; and
   the smooth surface is configured to fully reflect the second splitted beams.

3. The optical encoder according to claim 2,
   wherein the periodic structure portion is a plurality of groove portions formed having a cross-sectional square wave shape.

4. The optical encoder according to claim 2,
   wherein the periodic structure portion is a plurality of groove portions formed having a cross-sectional sine wave shape.

5. The optical encoder according to claim 1,
   wherein the periodic structure portion is a plurality of groove portions formed having a cross-sectional square wave shape.

6. The optical encoder according to claim 1,
   wherein the periodic structure portion is a plurality of groove portions formed having a cross-sectional sine wave shape.

* * * * *